(12) United States Patent
Hagino

(10) Patent No.: US 7,582,340 B2
(45) Date of Patent: Sep. 1, 2009

(54) CONTAINER FOR RETORT POUCH FOOD

(75) Inventor: Junichi Hagino, Osaka (JP)

(73) Assignee: Packs Co., Ltd, Osaka (JP)

( * ) Notice: Subject to any disclaimer, the term of this patent is extended or adjusted under 35 U.S.C. 154(b) by 435 days.

(21) Appl. No.: 11/398,946

(22) Filed: Apr. 6, 2006

(65) Prior Publication Data

US 2007/0237913 A1    Oct. 11, 2007

(51) Int. Cl.
- B31B 45/00    (2006.01)
- B65D 81/20    (2006.01)
- B65D 81/34    (2006.01)

(52) U.S. Cl. ............... 428/34.1; 426/118; 426/107; 426/113; 426/395; 220/495.03

(58) Field of Classification Search ........... 428/34.1
See application file for complete search history.

(56) References Cited

U.S. PATENT DOCUMENTS

| | | | | |
|---|---|---|---|---|
| 5,039,001 A | * | 8/1991 | Kinigakis et al. | 229/120 |
| 5,114,766 A | * | 5/1992 | Jacques | 428/35.7 |
| 5,167,900 A | * | 12/1992 | Odaka et al. | 264/512 |
| 5,241,149 A | * | 8/1993 | Watanabe et al. | 219/725 |
| 5,455,089 A | * | 10/1995 | Mochida et al. | 428/35.8 |
| 5,976,235 A | * | 11/1999 | Andersen et al. | 106/162.51 |
| 6,660,983 B2 | * | 12/2003 | Monforton et al. | 219/727 |
| 6,726,363 B1 | | 4/2004 | Marbler et al. | |
| 6,951,999 B2 | * | 10/2005 | Monforton et al. | 219/727 |
| 2003/0062365 A1 | * | 4/2003 | Krueger | 220/4.24 |
| 2004/0086207 A1 | | 5/2004 | Marbler et al. | |
| 2004/0109618 A1 | | 6/2004 | Marbler et al. | |
| 2006/0004193 A1 | * | 1/2006 | Muller et al. | 536/102 |
| 2006/0199717 A1 | | 9/2006 | Marbler et al. | |
| 2007/0110856 A1 | * | 5/2007 | Kanzaki | 426/107 |

FOREIGN PATENT DOCUMENTS

| | | | |
|---|---|---|---|
| DE | 4300141 A1 | * | 1/1993 |
| EP | 1 152 947 B1 | | 6/2005 |
| EP | 0 619 242 A1 | | 10/2007 |
| JP | 2000-313480 | | 11/2000 |
| JP | 2003226365 A | * | 8/2003 |
| JP | 2005-035567 A | * | 2/2005 |
| JP | 2005035567 A | * | 2/2005 |
| WO | WO 96/04187 | | 2/1996 |
| WO | WO 02/0517 A1 | | 7/2002 |
| WO | WO 2004076311 A1 | * | 9/2004 |

* cited by examiner

*Primary Examiner*—Jennifer McNeil
*Assistant Examiner*—Vera Katz
(74) *Attorney, Agent, or Firm*—Knobbe Martens Olson & Bear LLP

(57) ABSTRACT

A container for retort pouch food according to the present invention comprises a container main body in which an upper surface is open and a protruding edge portion is provided on an edge portion of the opening, the container main body further having a bottom and substantially cylindrical shape and capable of containing contents inside, and a cover film thermally adherable to the protruding edge portion and capable of sealing the opening of the container main body in which the contents are contained, wherein the container main body is provided with a pocket part in which a pocket is formed between the container main body and the cover film at a position continuous to the protruding edge portion when heated, and the cover film is formed from a laminate film and provided with an easily-breakable part at a part thereof covering the pocket part.

12 Claims, 2 Drawing Sheets

CONTAINER FOR RETORT POUCH FOOD

BACKGROUND OF THE INVENTION

1. Field of the Invention

The present invention relates to a container for retort pouch food, more particularly to a container for retort pouch food which can be cooked in a microwave oven.

2. Description of the Related Art

The retort pouch food has a number of advantages. For example, the retort pouch food, which is hygienically sealed in an airtight container, and pressurized and heated to be sterilized, has a good keeping quality. Further, the retort pouch food is simply dipped in hot water to be heated when used, and therefore, can be easily cooked. Because of these advantages, the retort pouch food is made widely and often available.

When a microwave oven is used for heating, the retort pouch food can be more speedily cooked in an energy-saving manner. Therefore, the microwave oven is often used for heating a container for the retort pouch food.

The container for the retort pouch food usable in the microwave oven generally available is obtained in such a manner that a laminate film including resin superior in an oxygen blocking property such as vinylidene chloride is thermally adhered to an upper-surface opening of a main body of the container containing contents so that the contents can be sealed therein. Because the airtight container for retort pouch food bursts and the contents thereby pop out when heated, the container is previously provided with holes at a few sections thereof with a fork or the like before heating, or heated in several times. More specifically, in many cases, a top sealing sheet of the container (sealing part which is easily peelable) is peeled and the contents are stirred, and thereafter, the container is sealed with a cover film and heated, the container is removed from the microwave oven so that the contents in the container are stirred again, and the container is heated again in the microwave oven. The described process, in which it becomes necessary to form the holes in the container and stir the contents, and the contents may pop out of the container if the holes are not correctly made, was not favorable.

In order to make it unnecessary to form the holes, a container for retort pouch food which is heated in the microwave oven after a part of the sealing sheet of the container is peeled before heating was manufactured. An easy peeling process is applied to the container for retort pouch food in advance so that the particular part of the sealing sheet can be easily peeled. The easy peeling process adopts, for example, a method in which a slit is previously formed at an end of the laminate film thermally adhered to the container main body and the container is sealed with a specially-made ink also serving as an adhesive.

In the case of the foregoing method, however, the contents contained in the container main body, if they are liquid or gas exchange packaging, may unfavorably leak from the slit during the transportation to the consumers' market. Another disadvantage is that the easy peeling process inevitably increases a manufacturing cost of the container itself.

SUMMARY OF THE INVENTION

Therefore, a main object of the present invention is to provide a container for retort pouch food making it unnecessary to apply an easy peeling process and capable of unfailingly preventing leakage even if contents contained in a main body of the container are liquid or gas exchange packaging and preventing sudden burst of a laminate film even as the container is heated in a microwave oven.

A container for retort pouch food according to the present invention comprises:

a container main body in which an upper surface is open and a protruding edge portion is provided on an edge portion of the opening, the container main body further having a bottom and substantially cylindrical shape and capable of containing contents inside; and a cover film thermally adherable to the protruding edge portion and capable of sealing the opening of the container main body in which the contents are contained, wherein the container main body is provided with a pocket part in which a pocket is formed between the container main body and the cover film at a position continuous to the protruding edge portion when heated, and the cover film is formed from a laminate film and provided with an easily-breakable part at a part thereof covering the pocket part.

According to the foregoing constitution, a heating time of the microwave oven can be reduced, and an internal pressure is concentrated on the pocket part when the internal pressure is increased when heated in the microwave oven, which results in breakage of only the easily-breakable part formed on the part covering the pocket part. Therefore, it becomes unnecessary to form any slit at an end of the laminate film, and yet, the sudden burst of the cover film can be prevented when heated in the microwave oven because vapor surely and easily escapes from the easily-breakable part of the cover film. More specifically, it becomes unnecessary to previously form holes at a few sections of the container with a fork or the like before heating and stir the contents, and the container for retort pouch food according to the present invention can be placed in the microwave oven to be heated and thereby preferably cooked in a short period of time. Further, there is no risk of leakage of the contents during the transportation in the absence of any hole even if the contents are liquid or gas exchange packaging.

As a result, the container for retort pouch food making it unnecessary to apply an easy peeling process, and yet, capable of surely preventing the contents contained in the container main body from leaking even if they are gas or gas exchange packaging and preventing the laminate film from suddenly bursting as the container is heated in the microwave oven could be provided.

The cover film is preferably a laminate film comprising at least an outermost-surface layer, a blocking layer and an inner layer, wherein the blocking layer has an oxygen blocking property.

According to the foregoing constitution, the container for retort pouch food according to the present invention can conveniently achieve a good keeping quality.

An adherent printing lacquer which is easily peelable when the internal pressure is increased by heating and does not cause any adverse influence in terms of hygiene is preferably applied to between the films of the cover film so that the films are adhered to each other.

According to the foregoing constitution, the printing lacquer generates no adverse influence in terms of hygiene and is capable of easily escaping vapor from the container main body, which is convenient when the contents are food.

The printing lacquer is preferably various grain starches, various polysaccharides originated from natural substances such as galactomannan, proteins such as corn protein, albumin and gelatin, a natural gum substance, shellac, or glycerin, or a substance in which these are combined.

According to the foregoing constitution, the printing lacquer can conveniently have such an appropriate adhesive strength that it can be peeled only after the internal pressure is increased by heating, and generates no adverse influence in terms of hygiene.

The pocket part is preferably provided between a projecting portion projecting inward from the protruding edge portion and the cover film, wherein the printing lacquer is applied from a position covering the projecting portion through to the protruding edge portion in the container main body.

According to the foregoing constitution, the projecting portion can be easily formed in the container main body by means of vacuum forming, pressure forming or the like. The present constitution is convenient for mass production, which allows and the container to be inexpensively produced. Further, the easily-breakable part can be easily and surely formed at the part covering the pocket part.

A plurality of projecting portions may be formed inward from the protruding edge portion of the container main body, and the pocket part may be provided at an interval between the plurality of projecting portions and the cover film, and between an interspace of the plurality of projecting portions and the cover film.

According to the foregoing constitution as well, the container can be inexpensively produced by means of the vacuum forming, the pressure forming or the like, and further, the easily-breakable part can be easily and surely formed at the part covering the pocket part in the same manner.

A depressed portion may be formed in a part of the protruding edge portion of the container main body, and the pocket part may be provided at an interval between the depressed portion and the cover film.

According to the foregoing constitution as well, the container can be inexpensively produced by means of the vacuum forming, the pressure forming or the like, and further, the easily-breakable part can be easily and surely formed at the part covering the pocket part in the same manner.

The upper-surface opening of the container main body may have a substantially rectangular shape, and a depressed portion may be formed in a part of the protruding edge portion at diagonal corner parts of the container main body, and the pocket part may be provided at an interval between the depressed portion and the cover film.

According to the foregoing constitution, the container can be inexpensively produced by means of blow molding or the like since the container is rectangular, and further, the easily-breakable part can be easily and surely formed at the part covering the pocket part in the same manner.

DETAILED DESCRIPTION OF THE PREFERRED EMBODIMENTS

Figure 1:
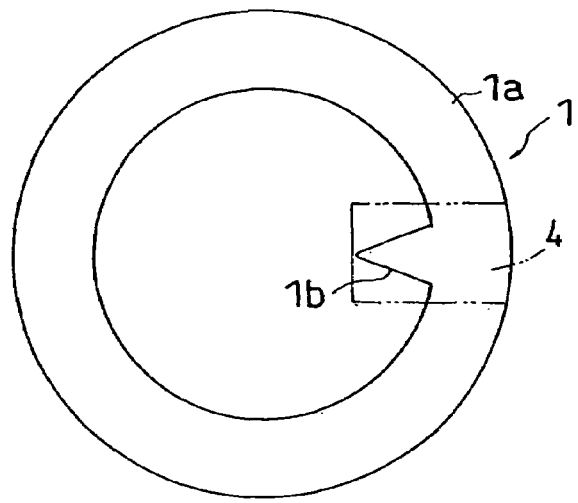
FIG. 1 is a plan view of a main body of a container for retort pouch food according to a preferred embodiment of the present invention.

Hereinafter, preferred embodiments of a container for retort pouch food according to the present invention are described in detail referring to the drawings. FIG. 1 shows a plane structure of a main body of a container for retort pouch food.

Figure 2:
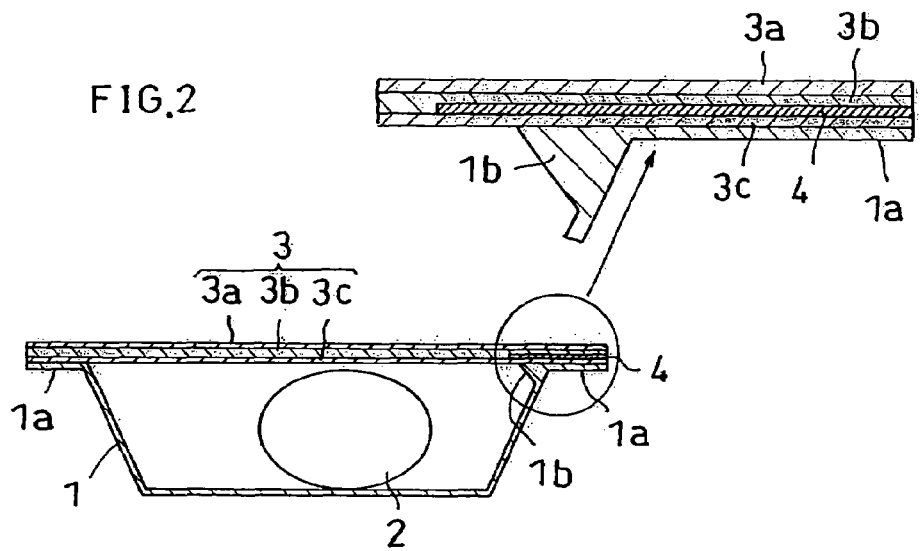
FIG. 2 is a front view illustrating a state of the container for retort pouch food shown in FIG. 1 before heating.

A container for retort pouch food 1 comprises a resin-made container main body 1 comprising a protruding edge portion 1a along an upper-surface opening and having a bottom and a substantially cylindrical shape, and a cover film 3 thermally adhered to the protruding edge portion 1a so as to coat contents 2, such as food, contained in the container main body 1 as shown in FIGS. 1 and 2.

The container main body 1 is formed from resin such as polypropylene by means of blow molding, and has a depressed portion deep enough to contain the contents 2. For reference, the method of forming the container main body 1 is not necessarily particularly limited.

The container main body 1 further comprises a projecting portion 1b projecting inward of the container main body and including a flat and smooth upper surface substantially flush with the protruding edge portion 1a. The cover film 3 is not thermally adhered to the projecting portion 1b. Therefore, when the cover film 3 starts to expand due to an increased internal pressure when heated during use, a pocket is generated in the projecting portion 1b. As the internal pressure is further increased as a temperature increases by heating, the internal pressure is concentrated on the formed pocket. Then, the film in the pocket part is broken, and the relevant part thereby constitutes an easily-breakable part. Accordingly, vapor generated by heating can easily escape therefrom as described later. As a result, the cover film is prevented from instantly breaking due to the increased internal pressure, which prevents the contents from popping out of the container main body. Therefore, an interval between the projecting portion 1b and the cover film 3 constitutes a pocket part in which the pocket is formed at a position continuous to the protruding edge portion 1a when heated.

A laminate film of a multilayer structure having films of a plurality of types constitutes the cover film 3. A blocking layer 3b having a superior oxygen blocking property, such as vinylidene chloride, is provided at a central part of the laminate film 3. The laminate film 3 has such a multilayer film structure that an outermost-surface layer 3a, such as a nylon film, a polyethylene terepht-halate (PET) film or an OPP film having a good printability, is provided on an outermost-surface side of both surfaces of the blocking layer 3, and an inner layer 3c, such a polypropylene film or a polyethylene film, is provided on a side thermally adhered to the container main body. Though the multilayer structure may be variously constructed other than the foregoing combination of the layers, at least the outermost-surface layer 3a, blocking layer 3b and inner layer 3c are preferably provided. Further, the inner layer 3c is thinner than the outermost-layer 3a and the blocking layer 3b and has such a material quality as more easily breakable than these layers. The cover film 3 is necessarily formed from any material that can be heated in a microwave oven.

An adhesive printing lacquer 4 easily peelable when the internal pressure is increased by heating is applied to between the blocking layer 3b and the inner layer 3c covering the projecting portion 1b of the container main body so that the blocking layer 3b and the inner layer 3c are adhered to each other. More specifically, the printing lacquer 4 is applied from a position covering the projecting portion 1b through to the protruding edge portion 1a in the container main body as shown in a dashed line in FIG. 1. The printing lacquer 4 is advantageous in that not only any hygienic problem is not generated but also it is easily peelable as the internal pressure of the container main body increases. A method of applying the printing lacquer is not particularly limited, and any of different printing methods conventionally known can be adopted.

The printing lacquer 4 should have an appropriate level of viscosity, however, a superior adhesive strength is not necessary. The printing lacquer 4 preferably has the adhesive strength of such a level that it is easily peelable as the internal pressure of the container main body increases when heated in the microwave oven. The printing lacquer 4 can employ various grain starches, various polysaccharides originated from natural substances such as galactomannan, proteins such as corn protein, albumin and gelatin, a natural gum substance, shellac, or glycerin, or a substance in which these are combined.

The laminate film 3 and the container main body 1 are thermally adhered to each other by means of a device such as an impact sealer and sealed after the contents are contained in the container main body 1. Thereafter, the heating process is applied under predetermined conditions so that the contents are sterilized.

Figure 3:
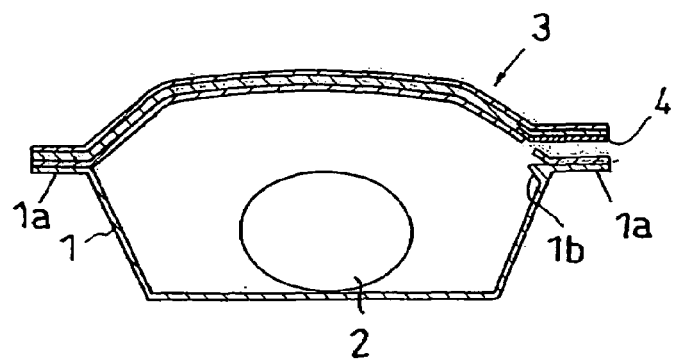
FIG. 3 is a front view illustrating a state of the container for retort pouch food shown in FIG. 1 after heating.

Next is described a case where the container for retort pouch food according to the present preferred embodiment is heated in the microwave oven referring to FIGS. 2 and 3.

FIG. 2 shows a state of the container for retort pouch food in which the contents are contained before heating. When the container for retort pouch food is heated in the microwave oven, the cover film starts to expand as the internal pressure increases.

Then, as shown in FIG. 3, a pocket is formed between the projecting portion 1b of the container main body and the cover film 3 covering the projecting part 1b, and the internal pressure is increased in comparison to other areas of the container main body 1, which breaks the inner layer 3c. The part to which the printing lacquer 4 is applied is peeled substantially at the same time as the breakage of the inner layer 3c, and vapor inside the container main body 1 immediately escapes out of the container. Therefore, the cover film 3 is prevented from suddenly breaking, which prevents the contents from popping out and scattering in the microwave oven. Further, the container for retort pouch food, which is not provided with any slit conventionally adopted, the contents, even if they are liquid or gas exchange packaging, can be prevented from leaking during the transportation.

Another Embodiment

Figure 4:
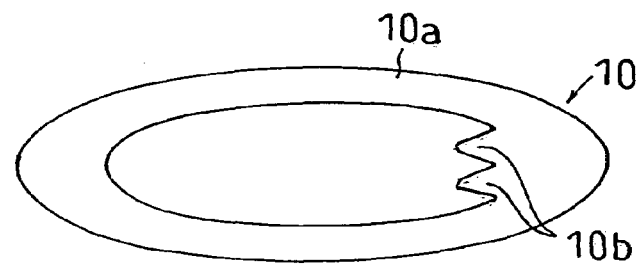
FIG. 4 is a plan view of a main body of a container for retort pouch food according to another preferred embodiment of the present invention.

1) In the foregoing embodiment, the upper-surface opening of the container main body is substantially circular. However, an upper-surface opening of a container main body 10 may have a substantially elliptic shape and be provided with two projecting portions 10b projecting inward from a protruding edge portion 10a of the container main body 10 as shown in FIG. 4. Such a constitution can also prevent the contents popping out and scattering in the microwave oven in a manner similar to that of the foregoing preferred embodiment. The number of the projecting portions 10b is not necessarily limited to two and may be increased. The shape of the projecting portion 10b is not limited to the shape shown in FIG. 4, and may have a rectangular shape, an arc shape or the like.

A pocket part in which a pocket is formed in a position continuous to the protruding edge portion 10a is appropriately provided at an interval between the two projecting portions 10b and the cover film, and an interval between an interspace of the two projecting portions 10b and the cover film.

Figure 5:
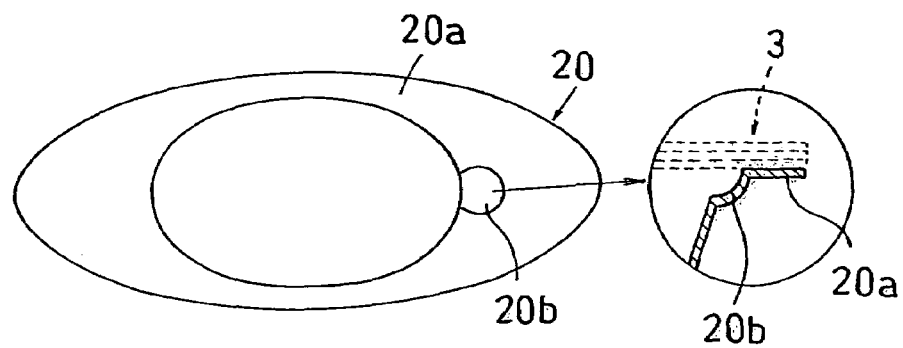
FIG. 5 is a plan view of a main body of a container for retort pouch food according to still another preferred embodiment of the present invention.

2) As shown in FIG. 5, an upper-surface opening of a container main body 20 may have a substantially elliptic shape and be provided with a depressed portion 20b in a part of a protruding edge portion 20a of the container main body 20 as well. Accordingly, an effect similar to that of the foregoing embodiment can be exerted. A pocket part in which a pocket is formed at a position continuous to the protruding edge portion is appropriately provided at an interval between the depressed portion 20b and the cover film as shown in a sectional structure shown in a balloon of FIG. 5. The upper-surface opening of the container main body 20 may be circular.

Figure 6:
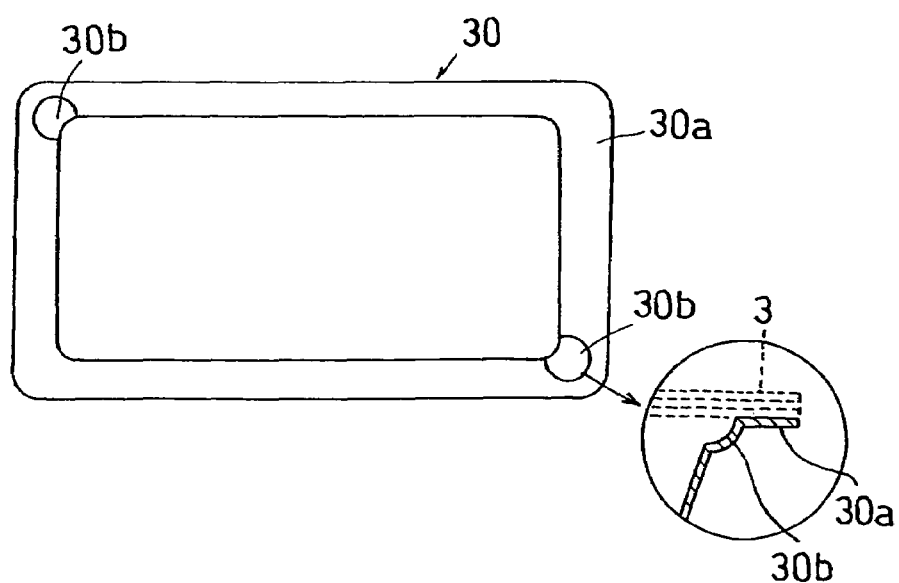
FIG. 6 is a plan view of a main body of a container for retort pouch food according to still another preferred embodiment of the present invention.

3) As shown in FIG. 6, an upper-surface opening of a container main body 30 may have a substantially rectangular shape and be provided with depressed portions 30b in a part of a protruding edge portion 30a of the container main body 30 at two diagonal corner parts. The depressed portion 30b may be provided only at one of the diagonal corner parts, or the number of the depressed portions may be increased. Accordingly, an effect similar to that of the foregoing preferred embodiment can be exerted. A pocket part in which a pocket is formed at a position continuous to the protruding edge portion is appropriately provided at intervals between the two depressed portions 30b and the cover film as shown in a sectional structure shown in a balloon of FIG. 6.

What is claimed is:

1. A container for retort pouch food comprising:
a container main body in which an upper surface is open and a protruding edge portion is provided on an edge portion of the opening, the container main body further having a bottom and substantially cylindrical shape and capable of containing contents inside; and
a cover film thermally adherable to the protruding edge portion and capable of sealing the opening of the container main body in which the contents are contained, the cover film further comprising at least an outermost-surface layer, a blocking layer and an inner layer,
wherein the inner layer is thinner than the outermost-layer and the blocking layer and has a material quality as more easily breakable than these layers, the container main body is provided with a pocket part formed between the container main body and the cover film at a position, that is continuous to the protruding edge portion and a part of the edge of the opening of the container main body, and the cover film is formed from a laminate film, an adherent printing lacquer, which is easily peelable when an internal pressure is increased by heating and does not cause any adverse influence in terms of hygiene, is applied to between the films of the cover film so that the films are adhered to each other, and the cover film is provided with an easily-breakable part at a part thereof covering the pocket part.

2. The container for retort pouch food as claimed in claim 1, wherein the cover film is the laminate film comprising at least an outermost-surface layer, a blocking layer and an inner layer, and the blocking layer has an oxygen blocking property.

3. The container for retort pouch food as claimed in claim 1, wherein the printing lacquer is various grain starches, various polysaccharides originated from natural substances, a natural gum substance, shellac, glycerin, or a substance in which these are combined.

4. The container for retort pouch food as claimed in claim 3, wherein the printing lacquer is galactomannan or protein.

5. The container for retort pouch food as claimed in claim 4, wherein the protein is selected from the group consisting of corn protein, albumin and gelatin.

6. The container for retort pouch food as claimed in claim 1, wherein
the pocket part is provided between a projecting portion projecting inward from the protruding edge portion and the cover film, the cover film is not thermally adhered to the projecting portion, and the printing lacquer is applied from a position covering the projecting portion through to the protruding edge portion in the container main body.

7. The container for retort pouch food as claimed in claim 1, wherein
a plurality of projecting portions is formed inward from the protruding edge portion of the container main body, and the pocket part is provided at an interval between the plurality of projecting portions and the cover film, and between an interspace of the plurality of projecting portions and the cover film.

8. The container for retort pouch food as claimed in claim 7, wherein
the cover film is the laminate film comprising at least an outermost-surface layer, a blocking layer and an inner layer, and the blocking layer has an oxygen blocking property, and
an adherent printing lacquer which is easily peelable when an internal pressure is increased by heating and does not cause any adverse influence in terms of hygiene is applied to between the films of the cover film so that the films are adhered to each other.

9. The container for retort pouch food as claimed in claim 1, wherein
a depressed portion is formed in a part of the protruding edge portion of the container main body, and the pocket part is provided at an interval between the depressed portion and the cover film.

10. The container for retort pouch food as claimed in claim 9, wherein
the cover film is a laminate film comprising at least an outermost-surface layer, a blocking layer and an inner layer, and the blocking layer has an oxygen blocking property, and
an adherent printing lacquer which is easily peelable when an internal pressure is increased by heating and does not cause any adverse influence in terms of hygiene is applied to between the films of the cover film so that the films are adhered to each other.

11. The container for retort pouch food as claimed in claim 1, wherein
the upper-surface opening of the container main body has a substantially rectangular shape, a depressed portion is formed in a part of the protruding edge portion at diagonal corner parts of the container main body, and the pocket part is provided at an interval between the depressed portion and the cover film.

12. The container for retort pouch food as claimed in claim 11, wherein
the cover film is the laminate film comprising at least an outermost-surface layer, a blocking layer and an inner layer, and the blocking layer has an oxygen blocking property, and
an adherent printing lacquer which is easily peelable when an internal pressure is increased by heating and does not cause any adverse influence in terms of hygiene is applied to between the films of the cover film so that the films are adhered to each other.

* * * * *

UNITED STATES PATENT AND TRADEMARK OFFICE
CERTIFICATE OF CORRECTION

PATENT NO. : 7,582,340 B2  Page 1 of 1
APPLICATION NO. : 11/398946
DATED : September 1, 2009
INVENTOR(S) : Junichi Hagino It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 450 days.

Signed and Sealed this

Fourteenth Day of September, 2010

David J. Kappos
*Director of the United States Patent and Trademark Office*